(12) United States Patent
Rübsam et al.

(10) Patent No.: US 8,113,082 B2
(45) Date of Patent: Feb. 14, 2012

(54) EXTERNAL GEAR SHIFT FOR A MANUAL TRANSMISSION

(75) Inventors: Christian Rübsam, Ketten (DE); Jan Sporleder, Goldbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 12/366,783

(22) Filed: Feb. 6, 2009

(65) Prior Publication Data
US 2009/0199669 A1    Aug. 13, 2009

(30) Foreign Application Priority Data

Feb. 6, 2008 (DE) .................. 10 2008 007 692

(51) Int. Cl.
*B60K 20/00* (2006.01)
(52) U.S. Cl. ..................................... 74/473.3
(58) Field of Classification Search ............. 74/473.1, 74/473.3, 473.34, 519, 523, 527
See application file for complete search history.

(56) References Cited

U.S. PATENT DOCUMENTS

| | | | |
|---|---|---|---|
| 4,297,910 A * | 11/1981 | Myers ........................ | 74/473.1 |
| 4,633,728 A * | 1/1987 | May ........................... | 74/473.28 |
| 4,738,153 A * | 4/1988 | Sabel ......................... | 74/473.28 |
| 4,807,489 A | 2/1989 | Schreiner et al. | |
| 5,056,376 A * | 10/1991 | Moroto et al. ............... | 74/335 |
| 5,415,056 A * | 5/1995 | Tabata et al. ................ | 74/335 |
| 7,454,992 B2 | 11/2008 | Yone et al. | |

FOREIGN PATENT DOCUMENTS

| | | |
|---|---|---|
| DE | 19511510 C1 | 7/1996 |
| DE | 11200400154 T5 | 6/2006 |
| EP | 0955488 A1 | 11/1999 |
| EP | 1235006 A1 | 8/2002 |
| JP | 6147314 A | 5/1994 |

\* cited by examiner

*Primary Examiner* — Vicky Johnson

(74) *Attorney, Agent, or Firm* — Ingrassia Fisher & Lorenz, P.C.

(57) ABSTRACT

An external gear shift for the gear selection in a manual transmission is provided that includes, but is not limited to a gearshift/selector lever, which is guided in a link plate and which is movable along a selector track and a plurality of shifting tracks, and a measuring sensor to detect an instantaneous position (s, w) of the gearshift/selector lever. Guide fingers of the link plate disposed between shifting and selector tracks each have flanks oriented obliquely to the shifting and selector tracks.

16 Claims, 2 Drawing Sheets

EXTERNAL GEAR SHIFT FOR A MANUAL TRANSMISSION

CROSS-REFERENCE TO RELATED APPLICATION

This application claims priority to German Patent Application No. 102008007692.9, filed Feb. 6, 2008, which is incorporated herein by reference in its entirety.

TECHNICAL FIELD

The present invention relates to an external gear shift for the gear selection in a manual transmission comprising a gearshift/selector lever and a sensing element for detecting the position of the gearshift/selector lever. Such an external gear shift generally forms the user interface of a shift-by-wire shifting device, in which a control circuit triggers by reference to the detected position of the gearshift/selector lever.

BACKGROUND

A manual transmission conventionally has a shift rail which is movable in two degrees of freedom. Due to a movement in one of these degrees of freedom, the shift rail is brought into engagement with one or more synchronizing devices required to engage a gear and due to the movement in the other degree of freedom, this drives an adjusting movement of the respectively selected synchronizing device. These movements must substantially take place successively since the engagement of the shift rail must be made before its adjusting movement can be driven. In order to assist the driver during shifting and to ensure that selection and shifting movements are executed correctly one after the other, mechanical shifting devices conventionally have a link, in which a gearshift/selector lever coupled to the shift rail of the transmission is guided in shifting and selecting tracks which are orthogonal to one another. There are shift-by-wire shifting devices, which also use a gearshift/selector lever which is movably guided in a link in two degrees of freedom and which control the shift rail proportionally to the movement of the gearshift/selector lever in order to offer the driver the handling to which he is accustomed from mechanical gear shifts.

While in a mechanical shifting device, the driver may experience a resistance of the transmission to an unmatched shifting movement and can match the track along which he guides the gearshift/selector lever to this resistance, this is not possible in a shift-by-wire shifting device. In order to reliably eliminate a shifting movement which the transmission cannot follow, the link guiding the gearshift/selector lever must therefore have a narrow tolerance in a shift-by-wire shifting device. This makes a shifting process with track change laborious for the driver since the gearshift/selector lever cannot be moved in one stroke from one gear position into the other gear position but must be halted on the way twice at precisely the correct position to change the direction of movement.

In view of the foregoing, it is at least one object of the invention to provide an external gear shift for a shift-by-wire shifting device with a link-guided gearshift/selector lever, which allows rapid, convenient shifting. In addition, other objects, desirable features and characteristics will become apparent from the subsequent summary and detailed description, and the appended claims, taken in conjunction with the accompanying drawings and this background.

SUMMARY

This at least one object, other objects, desirable features and characteristics, are achieved by an external gear shift for the gear selection in a manual transmission comprising a gearshift/selector lever, which is guided in a link plate and which is movable along a selector track and a plurality of shifting tracks, and a measuring sensor to detect an instantaneous position of the gearshift/selector lever, in which guide fingers of the link plate disposed between shifting and selector tracks each have flanks oriented obliquely to the shifting and selector tracks.

Due to the obliquely oriented flanks, during the movement of the gearshift/selector lever in shifting movements with a track change in the area of the selector track, the movement can be transferred continuously from one selector track into the next so that any interruption of the movement transverse to the direction of the selector tracks can be avoided. The shape and position of the oblique flanks are expediently selected in such a manner that it is possible for the driver to make a rapid movement of the gearshift/selector lever, especially with a track change. The embodiments of invention are based on the knowledge that the shifting link can have a very large tolerance and can be optimized to a rapid movement of the gearshift/selector lever, if the basic principle of proportional control is broken and not every movement which the gearshift/selector lever can execute, is converted into a proportional movement of the shift rail. It is therefore not necessary for every position that the gearshift/selector lever can occupy on one of the sloping flanks to correspond to a possible position of the shift rail during proportional control of the shift rail; the task of guiding the shift rail on a previously known path having a sufficiently narrow tolerance for reliable shifting can be left to the control circuit.

The guide fingers are preferably provided with the oblique flanks on respectively only one side so that frequent shifting movements, for example, shifting to a next-higher or next-lower gear can be facilitated but unusual shifting movements which could correspond to undesirable shifting processes such as skipping over several gears, are made more difficult.

In particular, if two guide fingers disposed oppositely between two identical shifting tracks have oblique flanks on opposite sides, the shifting movement during a track change can be configured to be particularly comfortable and reliable in operation.

For a continuous movement of the gearshift/selector lever from one shifting track to an adjacent one, it is furthermore advantageous if the oblique flanks of the oppositely arranged guide fingers are disposed parallel to one another.

In particular, if the distance between tangents of the oblique flanks at least corresponds to a thickness of the gearshift/selector lever, the gearshift/selector lever can cross the selector track without needing to change its direction of movement.

With regard to the movement sequence of the shifting movement, it is furthermore advantageous if a tangent of one oblique edge extends at an angle between about 10 and 60 degrees to an edge of an adjoining shifting track. If the angle lies outside this range, the profile of the tangent is in each case too similar to the edge of a conventional shifting track or selector track to appreciably facilitate and accelerate the shifting movement.

In this case, particular advantages are achieved if the angle between the tangent of an oblique flank and the edge of the adjacent shifting track increases toward the selector track. Since the degree of inclination varies, an optimal shifting path can be achieved, for example, by means of a plurality of successive oblique sections, in which both the track changing movement and also the transition from or into the movement along the shifting tracks can be supported in an exceptional manner.

In addition, in an area of a guide finger facing away from the selector track, a straight section is preferably followed by an oblique flank so that very exact guidance of the gearshift/selector lever in an end area of the shifting track is achieved.

In this case, it is preferable if the length of the straight section is between about 25 and 30 percent of the shifting distance, the shifting distance being defined by the path of the gearshift/selector lever between a position in an engaged gear and a position in the selector track.

In addition, additional advantages are obtained for the external gear shift if one shifting track which is adjacent to a shifting track of a reverse gear has no oblique flank on a side facing the reverse gear. Thus, any undesirable movement of the gearshift/selector lever into the shifting track of the reverse gear can be made more difficult so that reverse gear can only be engaged with a shifting movement which is executed exactly during the track change.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
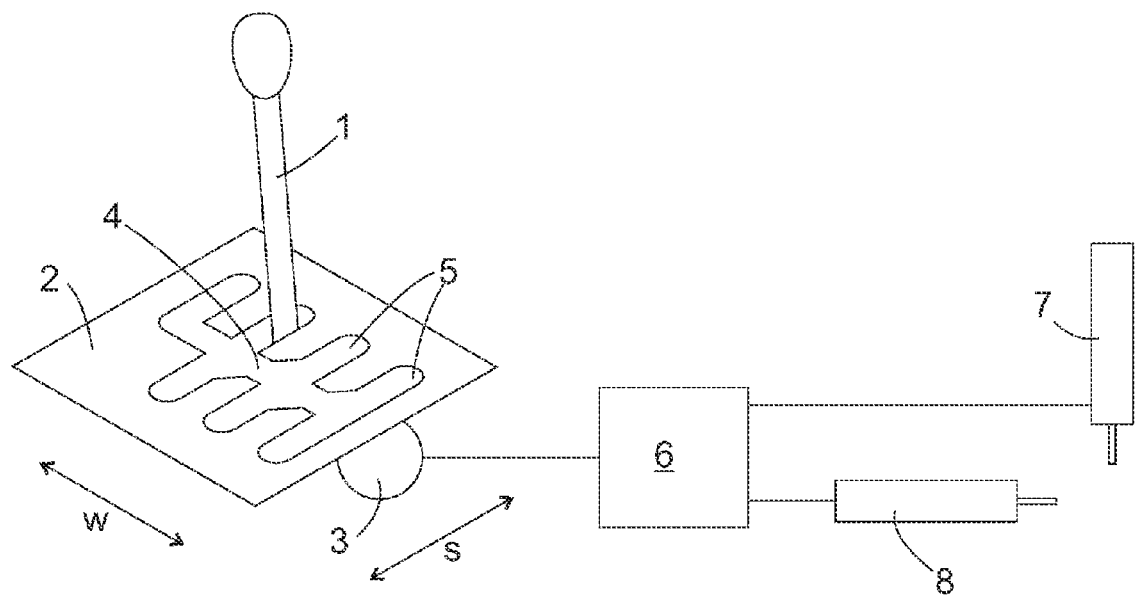
FIG. 1 shows a schematic diagram of a shift-by-wire shifting device, which uses an external gear shift according to an embodiment of the invention.

The shifting device shown schematically in FIG. 1 comprises an external gear shift with a gearshift/selector lever 1, which projects into the passenger compartment of an automobile and is guided in a link plate 2, and a sensor 3 for detecting the position of the gearshift/selector lever 1, which is movable in the direction of a selector track 4 cut out in the link plate 2 and in the direction of shifting tracks 5 which cross the selector track 4. The sensor 3 delivers coordinate values s, w of the gearshift/selector lever 1 with respect to these two directions to an electronic control circuit 6. Connected to the control circuit 6 is an actuator device with two degrees of freedom, shown here as two individual adjusting cylinders 7, 8. The adjusting cylinders 7, 8 drive a shifting movement in two degrees of freedom, such as possibly an axial displacement and a rotation, of a shift rail of a stepped transmission, which is not shown but is known per se.

As long as the gearshift/selector lever 1 is located in one of the tracks 4 or 5, the control circuit 6 specifies a desired position of the adjusting cylinder 7 for the shifting movement with reference to the coordinate s of the gearshift/selector lever 1 delivered by the sensor 3 in the shifting track direction, regardless of the selector track coordinate w, and a desired position of the adjusting cylinder 8 with reference to the selector track coordinate w and regardless of the shifting track coordinates. The rectilinearly elongated shifting and selector tracks 4, 5 are dimensioned in such a manner that each position that the gearshift/selector lever 1 can adopt in the shifting or selector tracks is mapped by the control circuit 6 onto a position of the adjusting cylinders 7, 8.

Figure 2:
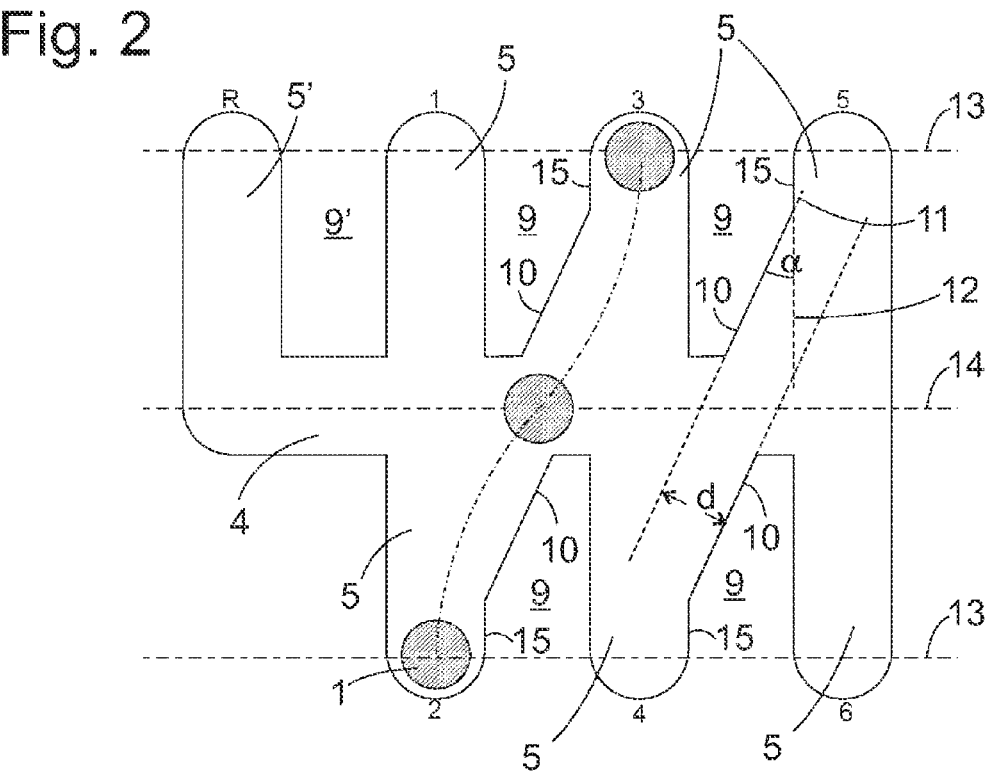
FIG. 2 shows a shifting link, in which a gearshift/selector lever is movable, according to a first embodiment of the invention.

FIG. 2 shows an enlarged plan view of the link plate 2. The specific shifting track for gears 1 and 2 is designated hereinafter by 1-2, the shifting track for gears 3 and 4 is designated by 3-4, and the shifting track for gears 5 and 6 is designated by 5-6. The positions of the gearshift/selector lever 1 at the respective end of the shifting tracks corresponding to the engaged gear are depicted by the dashed lines 13 in the diagram. A central line 14 representing a position of the gearshift/selector lever 1 in the selector track 4 is also shown by a dashed line.

A guide finger 9 is disposed between each two neighboring shifting tracks 5 on the link plate 2 on both sides of the selector track 4. Adjacent to the points of intersection of the selector and shifting tracks 4, 5, triangular sections are recessed from the link plate 2 so that the guide fingers 9 have an oblique flank 10 on one of their longitudinal sides in each case.

Two guide fingers located opposite one another between two identical shifting tracks 5 on both sides of the selector track 4 are provided with the oblique flanks 10 on respectively opposite longitudinal sides. The flanks 10 of these opposite fingers 9 are parallel to one another and the distance between the parallels formed by the two oblique flanks 10 corresponds at least to the thickness of a stick of the gearshift/selector lever 1 projecting through the link plate 2, so that the gearshift/selector lever 1 can be moved along the two oblique flanks 10 without a change of direction.

An angle α formed by the flanks 10 with an edge of an adjoining shifting track should be smaller than about 60° so as not to force an unnecessarily abrupt change in direction of the gearshift/selector lever 1 on changing from one shifting track 5 to the next. The slopes do not extend right into an outer section 15 of the shifting tracks 5 so that at the beginning of a shifting movement, the gearshift/selector lever 1 is always guided there in the direction of the opposite switching position of the same shifting track. The outer section 15 extends over about 25 to 30 percent of a shifting distance, which is defined by the distance between the end positions of the gearshift/selector lever 1 in the shifting tracks 5 marked by the line 13 from the central line 14 of the selector track 4. The angle α is therefore generally not less than about 10°.

In contrast to the shifting fingers 9 between the shifting tracks of the forward gears, a guide finger 9' formed between the shifting track 1-2 and a shifting track 5' for the reverse gear R disposed adjacent to this has no slope in order to avoid accidental shifting into reverse gear.

The diagram further shows a profile of a shifting movement of the gearshift/selector lever 1 corresponding to an upward shift into a next higher gear. The gearshift/selector lever 1 is initially located in a position at a lower end of the shifting track 1-2, which corresponds to second gear being engaged. As is indicated by the dot-dash line, a shifting movement in the direction of the upper end of the shifting track 3-4 is executed along the two guide fingers 9 between the shifting tracks 1-2 and 3-4, the oblique flanks 10 appreciably facilitating the movement since the gearshift/selector lever 1 crosses the selector track 4 without any abrupt change of direction.

Figure 3:
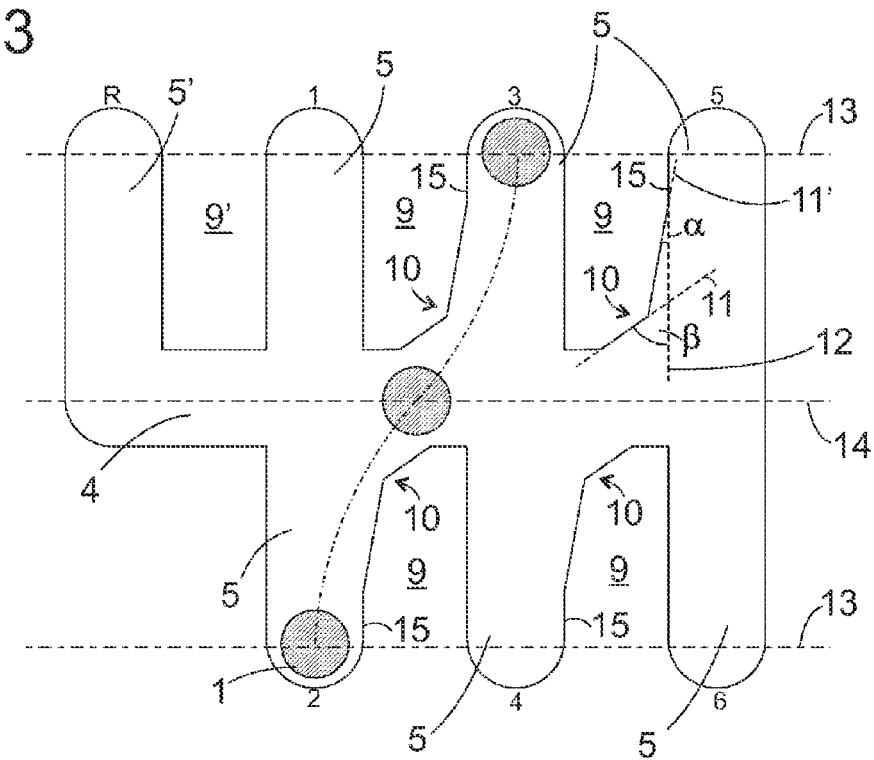
FIG. 3 shows the shifting link from FIG. 2 in another advantageous embodiment.

In FIG. 3, the link plate 2 explained in FIG. 2 is shown in another advantageous embodiment of the invention. In this case, the oblique flanks 10 of the guide fingers 9 comprise a plurality of sections of different slope, wherein the tangent 11 of a first section of the oblique flank 10 facing the selector track 4 with the line 12 representing the edge of the shifting track 5-6, encloses a larger angle than a tangent 11' of a second section of the oblique flank 10 facing away from the selector track 4. This form of the oblique flanks 10 supports a flowing shifting movement with change in track, as is again depicted by the dash-dot line, in an improved manner compared with the arrangement shown in FIG. 2.

Figure 4:
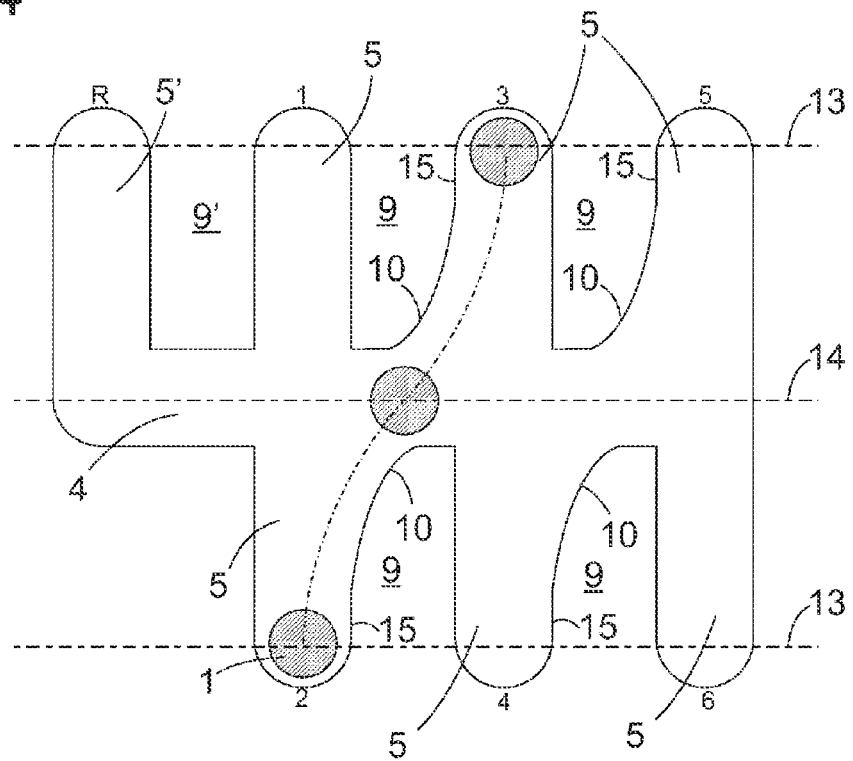
FIG. 4 shows the shifting link from FIG. 2 in a third advantageous embodiment.

If, in an advantageous further development of the invention, the oblique flanks 10 are each divided into a plurality of sections having different inclinations, and the angles formed in each case by the tangents of the sections 11, 11' etc. with the edge of the shifting track 5 increase toward the selector track 4, the arrangement shown in FIG. 4 is obtained, which optimizes the shifting movements with a track change with regard to their profile.

In this case, the beveled flanks 10 are configured as a rounding, and in each case, by means of the rounding of the flank 10, an end of the guide fingers 9 facing the selector track 4 goes over continuously into the straight section 15 of the guide fingers 9 at the end of the shifting track 5.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration o in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An external gear shift for a gear selection in a manual transmission, comprising:
   a link plate having guide fingers;
   a selector track;
   a plurality of shifting tracks;
   a gearshift/selector lever that is guided in the link plate and movable along the selector track and the plurality of shifting tracks;
   a measuring sensor adapted to detect an instantaneous position of the gearshift/selector lever, wherein the guide fingers of the link plate are disposed between the plurality of shifting tracks and the selector track and each have flanks oriented obliquely to the plurality of shifting tracks and the selector track, and wherein the measuring sensor generates first and second coordinate values corresponding to position of the gearshift/select lever, the first coordinate value corresponding to the position of the gearshift/selector within the selector track and the second coordinate value corresponding to the position of the gearshift/selector in the direction of the shifting tracks; and
   a control circuit coupled to the measuring sensor for receiving the first and second coordinate values; and
   an actuator device coupled to the electronic control circuit, the actuator having first and second degrees of freedom.

2. The external gear shift according to claim 1, wherein the guide fingers are provided with oblique flanks on a single side.

3. The external gear shift according to claim 1, wherein two of the guide fingers are oppositely disposed between two of the plurality of shifting tracks and have oblique flanks on opposite sides.

4. The external gear shift according to claim 3, wherein the oblique flanks of the guide fingers are disposed substantially parallel to one another.

5. The external gear shift according to claim 4, wherein a distance of the oblique flanks with respect to one another corresponds at least to a thickness of the gearshift/selector lever.

6. The external gear shift according to claim 1, wherein a tangent of an oblique flank extends at an angle between about 10 and 60 degrees to an edge of an adjoining shifting track.

7. The external gear shift according to claim 6, wherein the angle between the tangent of the oblique flank and the edge of the adjoining shifting track increases toward the selector track.

8. The external gear shift according to claim 1, wherein in an area of a guide finger facing away from the selector track, a straight section adjoins an oblique flank.

9. The external gear shift according to claim 8, wherein a length of the straight section is between about 25 and 30 percent of a shifting distance, wherein the shifting distance is defined by a path of the gearshift/selector lever between a engaged gear position of an engaged gear and a selector track position in the selector track.

10. The external gear shift according to claim 1, wherein a shifting track adjacent to a second shifting track of a reverse gear has no oblique flank on a side facing the reverse gear.

11. The external gear shift according to claim 1 further comprising first and second adjusting cylinders coupled to the actuator device for driving a shifting movement in two degrees of freedom.

12. The external gear shift according to claim 11 wherein the first and second degrees of freedom of the shifting movement correspond to axial displacement and rotation, respectively.

13. A drive-by-wire shifting device for use in a transmission system, the shifting device comprising:
   a link plate having guide fingers;
   a selector track;
   a plurality of shifting tracks;
   a gearshift/selector lever that is guided in the link plate and movable along the selector track and the plurality of shifting tracks;
   a measuring sensor adapted to detect an instantaneous position of the gearshift/selector lever, wherein the guide fingers of the link plate are disposed between the plurality of shifting tracks and the selector track and each have flanks oriented obliquely to the plurality of shifting tracks and the selector track, wherein the measuring sensor generates first and second coordinate values corresponding to position of the gearshift/selector lever, the first coordinate value corresponding to the position of the gearshift/selector within the selector track and wherein the second coordinate value correspond to the position of the gearshift/selector in the direction of the shifting tracks;
   a control circuit coupled to the measuring sensor for receiving the first and second coordinate values; and
   an actuator device coupled to the electronic control circuit, the actuator having first and second degrees of freedom.

14. A drive-by-wire shifting device according to claim 13 further comprising first and second adjusting cylinders coupled to the actuator device for driving a shifting movement in two degrees of freedom.

15. A drive-by-wire shifting device according to claim 14, wherein the guide fingers are provided with oblique flanks on a single side.

16. A drive-by-wire shifting device according to claim 15 wherein two of the guide fingers are oppositely disposed between two of the plurality of shifting tracks and have oblique flanks on opposite sides.

* * * * *